(12) United States Patent
Kim

(10) Patent No.: US 11,138,453 B2
(45) Date of Patent: Oct. 5, 2021

(54) DRIVING GUIDE METHOD AND APPARATUS FOR VEHICLE

(71) Applicant: LG ELECTRONICS INC., Seoul (KR)

(72) Inventor: Soryoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 202 days.

(21) Appl. No.: 16/578,105

(22) Filed: Sep. 20, 2019

(65) Prior Publication Data

US 2020/0012873 A1    Jan. 9, 2020

(30) Foreign Application Priority Data

Sep. 6, 2019    (KR) .......................... 10-2019-0110713

(51) Int. Cl.
*G06K 9/00*        (2006.01)
*G06F 3/01*        (2006.01)
(Continued)

(52) U.S. Cl.
CPC ......... *G06K 9/00845* (2013.01); *B60W 30/09* (2013.01); *B60W 40/08* (2013.01); *G05D 1/0061* (2013.01); *G05D 1/0088* (2013.01); *G05D 1/0246* (2013.01); *G06F 3/013* (2013.01); *G06K 9/00805* (2013.01); *G06K 9/00818* (2013.01); *G06K 9/00825* (2013.01); *B60K 2370/149* (2019.05); *B60W 2400/00* (2013.01); *G05D 2201/0213* (2013.01)

(58) Field of Classification Search
CPC ................ G05D 1/0061; G06F 3/0416; G01C 21/3679; G01S 5/0263; G01S 13/931; H04W 64/003; B60K 35/00
See application file for complete search history.

(56) References Cited

U.S. PATENT DOCUMENTS 10,866,111 B2 *  12/2020  Kimura .............. G01C 21/3679
2010/0253542 A1 *  10/2010  Seder .................... G01S 13/931
340/932.2

(Continued)

FOREIGN PATENT DOCUMENTS

KR    1020110116580    10/2011

*Primary Examiner* — Yuri Kan
(74) *Attorney, Agent, or Firm* — Lee, Hong, Degerman, Kang & Waimey

(57) ABSTRACT

Disclosed is a driving guide method for a vehicle. The driving guide method includes: acquiring predicted driving information of a vehicle that is driving manually; acquiring gaze information of a user of the vehicle; identifying at least one recognition pattern information that is acquired based on history information corresponding to the predicted driving information; identifying recognition pattern information corresponding to the gaze information from among the at least one recognition pattern information; and displaying information on a region of interest that is determined based on the recognition pattern information. One or more of an autonomous vehicle a crime predicting apparatus of the present disclosure may be linked to an Artificial Intelligence (AI) module, an Unmanned Aerial Vehicle (UAV), a robot, an Augmented Reality (AR) device, a Virtual Reality (VR) device, a 5G service-related device, etc.

15 Claims, 12 Drawing Sheets

(51) Int. Cl.
*G05D 1/00* (2006.01)
*G05D 1/02* (2020.01)
*B60W 40/08* (2012.01)
*B60W 30/09* (2012.01)

(56) References Cited

U.S. PATENT DOCUMENTS

| | | | | |
|---|---|---|---|---|
| 2011/0001614 | A1* | 1/2011 | Ghneim | G06F 3/0481 |
| | | | | 340/435 |
| 2013/0288703 | A1* | 10/2013 | Yang | G01S 5/0205 |
| | | | | 455/456.1 |
| 2013/0303184 | A1* | 11/2013 | Yang | G01S 19/48 |
| | | | | 455/456.1 |
| 2014/0292665 | A1* | 10/2014 | Lathrop | G06F 3/013 |
| | | | | 345/173 |
| 2017/0176207 | A1* | 6/2017 | Jones | G01C 21/3679 |

* cited by examiner

DRIVING GUIDE METHOD AND APPARATUS FOR VEHICLE

CROSS-REFERENCE TO RELATED APPLICATION

Pursuant to 35 U.S.C. § 119(a), this application claims the benefit of earlier filing date and right of priority to Korean Patent Application No. 10-2019-0110713, filed on Sep. 6, 2019, the contents of which are hereby incorporated by reference herein in its entirety.

BACKGROUND

Field

The present disclosure relates to a method and an apparatus by which a computation device guides driving of an autonomously or manually driving vehicle. Particularly, the present disclosure relates to a driving guide method and a driving guide apparatus, by which when a vehicle enters a dangerous section included in a predicted drive route, a region of interest extracted from a first recognition pattern is displayed and whether a user recognizes the region of interest is recognized is identified.

Related Art

When a destination of a vehicle is input, at least one predicted drive route may be identified. The predicted drive route may include at least one dangerous section, and an accident may generally occur in the dangerous section for a similar accident cause. Thus, an accident may be prevented by displaying a region of interest corresponding to the accident cause on a screen of the vehicle and by identifying whether the region of interest is recognized by a user,

SUMMARY

In order to solve the aforementioned problem, embodiments of the present disclosure discloses a technology by which, when a vehicle enters a dangerous section included in a predicted drive route, a region of interest extracted from a first recognition pattern is displayed and whether the region of interest is recognized by a user is identified. A technical object of the present embodiments is not limited thereto, and other technical objects may be inferred from the following embodiments.

In one general aspect of the present disclosure, there is provided a driving guide method including: acquiring predicted driving information of a vehicle that is driving manually; acquiring gaze information of a user of the vehicle; identifying at least one recognition pattern information that is acquired based on history information corresponding to the predicted driving information; identifying recognition pattern information corresponding to the gaze information from among the at least one recognition pattern information; and displaying information on a region of interest that is determined based on the recognition pattern information.

In another general aspect of the present disclosure, there is provided a driving guide method including: predicted driving information of a vehicle that is driving autonomously; acquiring gaze information of a user of the vehicle; identifying a first recognition pattern that is acquired based on history information corresponding to the predicted driving information; and displaying information on a region of interest that is determined based on the first recognition pattern corresponding to at least one dangerous section included in the predicted driving information.

In another general aspect of the present disclosure, a vehicle may include a processor configured to acquire predicted driving information of the vehicle driving manually, acquire gaze information of a user of the vehicle, identify a first recognition pattern acquired based on history information corresponding to the predicted driving information, and determine a region of interest corresponding to at least one dangerous section included in the predicted driving information; and a display configured to display the determined region of interest.

According to an aspect, wherein the processor is configured to whether the region of interest is recognized, based on the region of interest and the gaze information of the user, and wherein the region of interest comprises a region extracted from the first recognition pattern and required to be recognized by the user, the possible accident-causing object comprises an object corresponding to a cause by which the at least one dangerous section is determined, and the first recognition pattern is determined based on gaze information of a user who has evaded a possible accident in the at least one dangerous section.

According to an aspect, the processor is configured to: when the possible accident-causing object is located in the region of interest, perform object recognition is performed with respect to the possible accident-causing object and thereby display the recognized possible accident-causing object; or when the possible accident-causing object does not exist, display an area where the region of interest is located in an enlarged form.

According to an aspect, wherein the predicted driving information comprises a predicted drive route of the vehicle and information on a dangerous section included in the predicted drive route, wherein the first recognition pattern is determined based on a gaze of a user who has evaded a possible accident in the dangerous section, and wherein gaze information of the user comprises an order whereby the user's gaze stops and a time for which the user's gaze stop.

According to an aspect, the processor is configured to: when the region of interest is recognized by the user in consideration of the gaze information of the user, guide the predicted drive route such that the predicted drive route comprises a shortest route to a destination of the vehicle; and when the region of interest is not recognized by the user, guide the predicted drive route such that the predicted drive route comprises a less number of dangerous sections compared to a case when the region of interest is recognized by the user.

Details of other embodiments are included in the detailed description and the accompanying drawings.

According to embodiments of the present specification, there are one or more effects as below.

First, a user's attention may be drawn to a region of interest in at least one dangerous section included in a predicted drive route to a destination, and thus, it is possible to prevent an accident.

Second, whether a region of interest displayed on a split screen is recognized may be identified using gaze information of a user of the vehicle and manual driving of the vehicle may be restricted according to whether the region of interest is recognized by the user, and thus, it is possible to enhance driving safety.

Third, when any or no accident occurs in a dangerous section, a recognition pattern learned using gaze information of the user may be used, and thus, it is possible to prevent an accident in a manner of imitating a human cognitive capability.

However, the effects of the present disclosure are not limited to the above-mentioned effects, and effects other than the above-mentioned effects can be clearly understood by those of ordinary skill in the art from the following descriptions.

DESCRIPTION OF EXEMPLARY EMBODIMENTS

Figure 1:
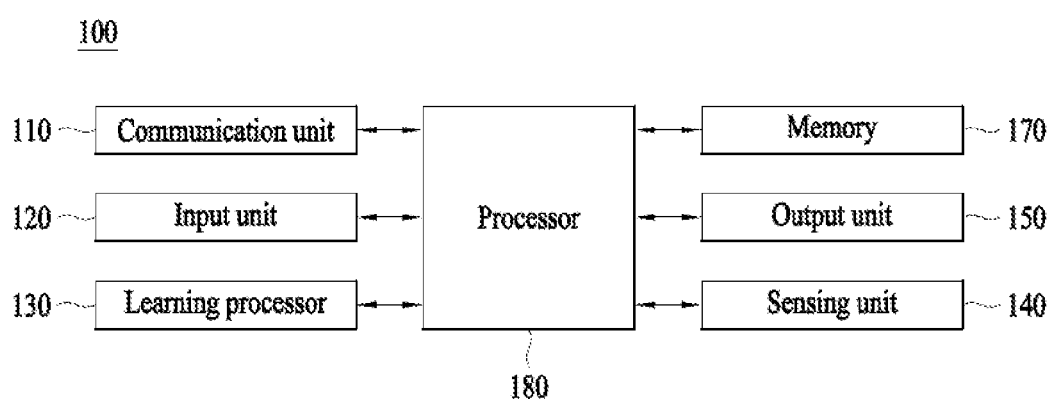
FIG. 1 shows an artificial intelligence (AI) device 100 according to an embodiment of the present disclosure.

Embodiments of the disclosure will be described hereinbelow with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Exemplary embodiments of the present disclosure are described in detail with reference to the accompanying drawings.

Detailed descriptions of technical specifications well-known in the art and unrelated directly to the present disclosure may be omitted to avoid obscuring the subject matter of the present disclosure. This aims to omit unnecessary description so as to make clear the subject matter of the present disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In addition, a controller mentioned in the embodiments may include at least one processor that is operated to control a corresponding apparatus.

Artificial Intelligence refers to the field of studying artificial intelligence or a methodology capable of making the artificial intelligence. Machine learning refers to the field of studying methodologies that define and solve various problems handled in the field of artificial intelligence. Machine learning is also defined as an algorithm that enhances the performance of a task through a steady experience with respect to the task.

An artificial neural network (ANN) is a model used in machine learning, and may refer to a general model that is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output input signals that are input through the synapse, weights, and the value of an activation function concerning deflection.

Model parameters refer to parameters determined by learning, and include weights for synaptic connection and deflection of neurons, for example. Then, hyper-parameters mean parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

Machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by an artificial neural network when learning data is input to the artificial neural network. The unsupervised learning may refer to a learning method for an artificial neural network in the state in which no label for learning data is given. The reinforcement learning may mean a learning method in which an agent defined in a certain environment learns to select a behavior or a behavior sequence that maximizes cumulative compensation in each state.

Machine learning realized by a deep neural network (DNN) including multiple hidden layers among artificial neural networks is also called deep learning, and deep learning is a part of machine learning. Hereinafter, machine learning is used as a meaning including deep learning.

The term "autonomous driving" refers to a technology of autonomous driving, and the term "autonomous vehicle" refers to a vehicle that travels without a user's operation or with a user's minimum operation.

For example, autonomous driving may include all of a technology of maintaining the lane in which a vehicle is driving, a technology of automatically adjusting a vehicle speed such as adaptive cruise control, a technology of causing a vehicle to automatically drive along a given route, and a technology of automatically setting a route, along which a vehicle drives, when a destination is set.

A vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

At this time, an autonomous vehicle may be seen as a robot having an autonomous driving function.

In addition, in this disclosure, extended reality collectively refers to virtual reality (VR), augmented reality (AR), and mixed reality (MR). VR technology provides real world objects or backgrounds only in CG images, AR technology provides virtually produced CG images on real objects images, and MR technology is a computer graphic technology that mixes and combines virtual objects in the real world and provides them.

MR technology is similar to AR technology in that it shows both real and virtual objects. However, there is a difference in that the virtual object is used as a complementary form to the real object in AR technology while the virtual object and the real object are used in the same nature in the MR technology.

XR technology can be applied to a HMD (Head-Mount Display), a HUD (Head-Up Display), a mobile phone, a tablet PC, a laptop, a desktop, a TV, a digital signage, etc., and a device to which XR technology is applied may be referred to as an XR device.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 1, Terminal 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
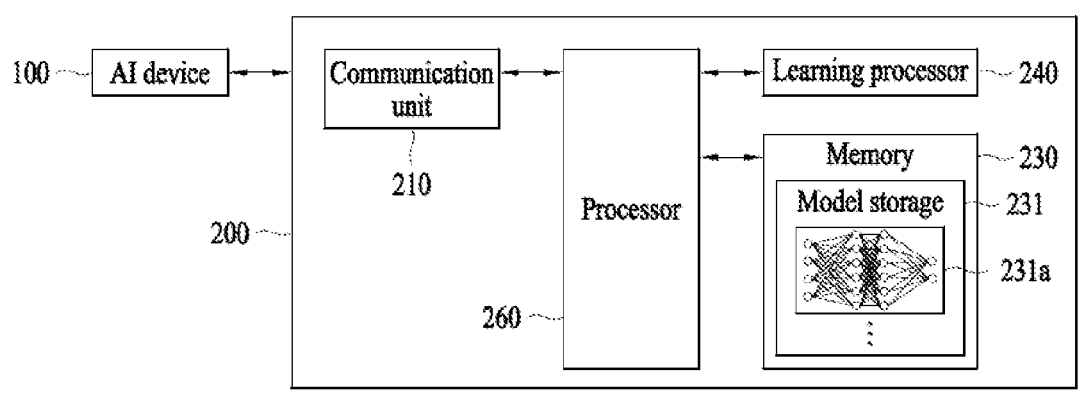
FIG. 2 shows an AI server 200 according to an embodiment of the present disclosure.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
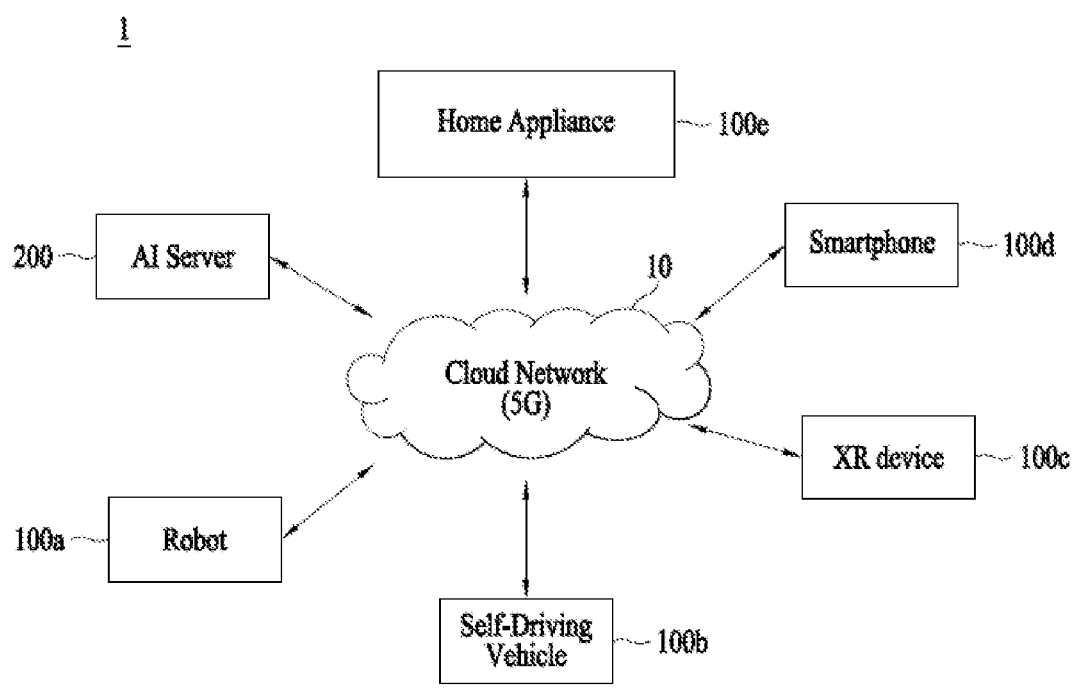
FIG. 3 shows an AI system 1 according to an embodiment of the present disclosure.

FIG. 3 illustrates an AI system 1 according to an embodiment of the present disclosure.

Referring to FIG. 3, in AI system 1, at least one of AI server 200, a robot 100a, an autonomous driving vehicle 100b, an XR device 100c, a smart phone 100d, and a home appliance 100e is connected to a cloud network 10. Here, robot 100a, autonomous driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, autonomous driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Autonomous driving vehicle 100b may be realized into a mobile robot, a vehicle, or an unmanned air vehicle, for example, through the application of AI technologies.

Autonomous driving vehicle 100b may include an autonomous driving control module for controlling an autonomous driving function, and the autonomous driving control module may mean a software module or a chip realized in hardware. The autonomous driving control module may be a constituent element included in autonomous driving vehicle 100b, but may be a separate hardware element outside autonomous driving vehicle 100b so as to be connected to autonomous driving vehicle 100b.

Autonomous driving vehicle 100b may acquire information on the state of autonomous driving vehicle 100b using sensor information acquired from various types of sensors, may detect (recognize) the surrounding environment and an object, may generate map data, may determine a movement route and a driving plan, or may determine an operation.

Here, autonomous driving vehicle 100b may use sensor information acquired from at least one sensor among a lidar, a radar, and a camera in the same manner as robot 100a in order to determine a movement route and a driving plan.

In particular, autonomous driving vehicle 100b may recognize the environment or an object with respect to an area outside the field of vision or an area located at a predetermined distance or more by receiving sensor information from external devices, or may directly receive recognized information from external devices.

Autonomous driving vehicle 100b may perform the above-described operations using a learning model configured with at least one artificial neural network. For example, autonomous driving vehicle 100b may recognize the surrounding environment and the object using the learning model, and may determine a driving line using the recognized surrounding environment information or object information. Here, the learning model may be directly learned in autonomous driving vehicle 100b, or may be learned in an external device such as AI server 200.

At this time, autonomous driving vehicle 100b may generate a result using the learning model to perform an operation, but may transmit sensor information to an external device such as AI server 200 and receive a result generated by the external device to perform an operation.

Autonomous driving vehicle 100*b* may determine a movement route and a driving plan using at least one of map data, object information detected from sensor information, and object information acquired from an external device, and a drive unit may be controlled to drive autonomous driving vehicle 100*b* according to the determined movement route and driving plan.

The map data may include object identification information for various objects arranged in a space (e.g., a road) along which autonomous driving vehicle 100*b* drives. For example, the map data may include object identification information for stationary objects, such as streetlights, rocks, and buildings, and movable objects such as vehicles and pedestrians. Then, the object identification information may include names, types, distances, and locations, for example.

In addition, autonomous driving vehicle 100*b* may perform an operation or may drive by controlling the drive unit based on user control or interaction. At this time, autonomous driving vehicle 100*b* may acquire interactional intention information depending on a user operation or voice expression, and may determine a response based on the acquired intention information to perform an operation.

In addition, in the present disclosure, XR device 100*c* is applied with AI technology and implemented as a head-mount display (HMD), a head-up display (HUD) provided in a vehicle, a television, a mobile phone, a smartphone, a computer, a wearable device, and a home appliance, a digital signage, a vehicle, a fixed robot or a mobile robot.

XR device 100*c* may analyze three-dimensional point cloud data or image data obtained through various sensors or from an external device to generate location data and attribute data for three-dimensional points, thereby acquiring information on the surrounding space or reality object, rendering an XR object to output, and outputting it. For example, XR device 100*c* may output an XR object including additional information on the recognized object in correspondence with the recognized object.

XR device 100*c* may perform the above-described operations using a learning model composed of at least one artificial neural network. For example, XR device 100*c* may recognize a reality object in three-dimensional point cloud data or image data using the learning model, and may provide information corresponding to the recognized reality object. Here, the learning model may be learned directly at XR device 100*c* or learned from an external device such as AI server 200.

At this time, XR device 100*c* may perform an operation by generating a result using a learning model by itself, but may transmit sensor information to an external device such as AI server 200 and receive the result generated accordingly to perform an operation.

An autonomous vehicle 100*b* may be subject to application of an AI technology and an XR technology to be implemented as a mobile robot, a vehicle, an unmanned aerial vehicle, etc.

The autonomous vehicle 100*b* to which the XR technology is applied may refer to an autonomous vehicle having a means for providing an XR image or an autonomous vehicle subject to control/interaction in an XR image. In particular, the autonomous vehicle 100*b* subject to control/interaction in an XR image may be differentiated from an XR device 100*c* and may be linked to the XR device 100*c*.

The autonomous vehicle 100 having the means for providing an XR image may acquire sensor information from sensors including a camera, and may output an XR image generated based on the acquired sensor information. For example, the autonomous vehicle 100 may include a head-up display (HUD) and display an XR image, so that an XR object corresponding to a real object or an object in a screen may be provided to an occupant.

In this case, when the XR object is output on the HUD, the XR object may be output such that at least a part thereof overlaps a real object to which a gaze of the occupant is directed. On the other hand, when the XR object is displayed on a display provided inside the autonomous vehicle 100*b*, the XR object may be displayed such that at least a part thereof overlaps an object on a screen. For example, the autonomous vehicle 100*b* may output XR objects corresponding to objects such as a lane, another vehicle, a traffic light, a traffic sign, a two-wheeled vehicle, a pedestrian, a building, etc.

When the autonomous vehicle 100*b* subject to control/interaction in an XR image acquires sensor information from sensors including a camera, the autonomous vehicle 100*b* or the XR device 100*c* may generate an XR image based on the sensor information and the XR device may output the generated XR image. In addition, the autonomous vehicle 100*b* may operate based on a control signal input through an external device such as the XR device 100*c* or based on interaction of a user.

Figure 4:
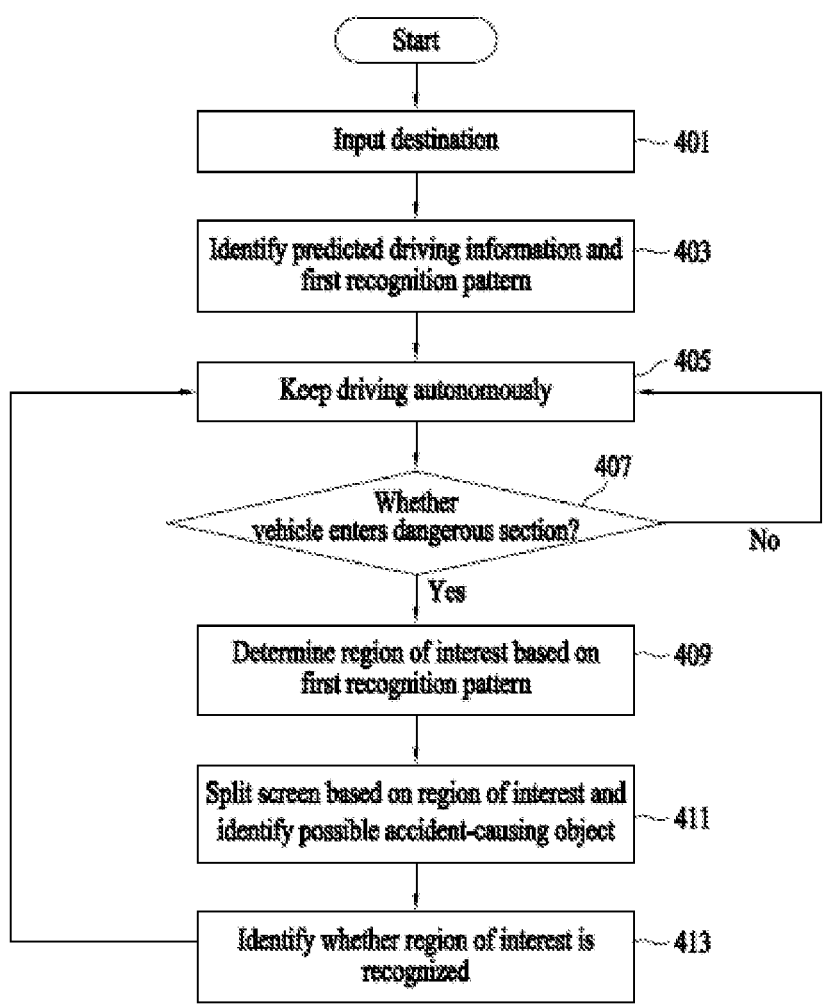
FIG. 4 is a diagram showing a method a driving guide method of a vehicle which is driving autonomously according to an embodiment of the present disclosure.

FIG. 4 is a diagram showing a method a driving guide method of a vehicle which is driving autonomously according to an embodiment of the present disclosure.

A vehicle may drive autonomously. A user present in the vehicle may input a destination (401). When the destination is input, the vehicle may acquire information on a predicted driving information from a server (403) and identify a first recognition pattern based on history information corresponding to the predicted driving information (403). In addition, the vehicle may identify gaze information regarding the user. Here, the server may be a device configured as a computing apparatus installed inside or outside the vehicle, and the vehicle may be a device configured as a computing apparatus as well.

The predicted driving information may include at least one predicted drive route from the current location of the vehicle to the destination, and at least one dangerous section included in the predicted drive route. Here, the predicted drive route may be a route suitable for a preset standard among routes from the current location to the destination. For example, when the user sets the standard in terms of a shortest distance or a shortest time, the predicted drive route may be a shortest distance or a shortest time from the current location to the destination, and, when the user sets the standard in terms of a safe section, the predicted drive route may be a route having a less number of dangerous sections from the current location to the destination. In addition, the dangerous section may be a section where an accident has occurred to an extent beyond a preset standard among at least one section included in the predicted drive route. For example, when a fatal accident has occurred in Section 2 among Section 1, Section 2, and Section 3 included in a predicted drive route, Section 2 may be set as a dangerous section, and, when accident has occurred in Section 3 once or more a day, Section 3 may be set as a dangerous section.

Specifically, the vehicle may receive a first predicted drive route 1, a second predicted drive route, and a third predicted drive route from the current location to the destination from the server, and receive a dangerous section included in each of the predicted drive routes. For example, the vehicle may receive at least one dangerous section included in the first predicted drive route, and at least one dangerous section included in the second predicted drive route.

The vehicle may identify a first recognition pattern corresponding to a dangerous section and received from the server. The first recognition pattern may be determined based on gaze information of a user which has evaded a possible accident in the dangerous section. The gaze information of the user having evaded the accident may include an order in which the user's gaze stops during driving in the dangerous section, and a time for which the user's gaze stops. Specifically, the order whereby the user recognizes an object may be identified by the order whereby the user's gaze stops, and the user's concentration on the object may be identified by the time for which the user's gaze stops. In this case, the gaze information of the user may be determined in consideration of the user's gaze on a vehicle ahead, or in consideration of the user's gaze not just on a region forward of the vehicle but also other region (e.g., a front passenger seat, a side mirror, etc.). The user's gaze may be determined based on a head tracker for tracking a head orientation of the user and an eye tracker for tracking an eye orientation of the user.

A type of a possible accident in a dangerous section may be determined by a cause by which the dangerous section is determined. Specifically, a first accident type may correspond to a case where an accident occurs in the dangerous section due to a specific object, a second accident type may correspond to a case where an accident occurs in the dangerous section due to another vehicle, and a third accident type may correspond to a case where an accident occurs in the dangerous section due to a driving state of the vehicle. An accident type is not limited thereto and may be determined by a cause by which the dangerous section is determined.

The first recognition pattern may be determined by gaze information of a user who has evaded a possible accident in the dangerous section. The first recognition pattern may be determined by learning the gaze information of the user which has evaded the possible accident in the dangerous section.

Having identified the predicted driving information and the first recognition pattern, the vehicle may keep driving autonomously along the determined predicted drive route (405). While driving autonomously, the vehicle may identify whether the vehicle has entered a dangerous section based on a Global Positioning System (GPB) (407). When entering the dangerous section, the vehicle may determine a region of interest using the first recognition pattern which corresponds to a possible accident type in the dangerous section (409). Here, the region of interest may include a region extracted from the first recognition pattern and required to be recognized by the user.

The vehicle may split a screen based on the region of interest, and identify a possible accident-causing object present in an area where the region of interest is located (411). The screen may be spited according to the number of regions of interest and areas where the regions of interest are located. The screen may include a front display (e.g., a front glass) viewed to a user present in the vehicle. For example, if three regions of interest are extracted, the screen may be split into four parts, and the regions of interest may be located in the first quadrant, the third quadrant, and the fourth quadrant in the four-split screen. In this case, to increase computational processing speed, the screen may be split by even numbers. For example, if there are five regions of interest, the screen may be split into six parts rather than five parts.

In an area where a region of interest is located in a split screen, object recognition may be performed in regard with a possible accident-causing object and the recognized possible accident-causing object may be displayed. A recognized possible accident-causing object may be an object corresponding to a region for which a dangerous section is determined. Specifically, if an accident occurs due to a specific object, the possible accident-causing object may be the specific object; if an accident occurs with another vehicle, the possible accident-causing object may be another vehicle or bicycle; and, if an accident occurs due to anxious driving caused by a road surface state, the possible accident-causing object may be the road surface state. For example, if an accident occurs due to another vehicle driving on the right lane joining at a junction, the possible accident-causing object may be the another vehicle driving on the right lane.

If any possible accident-causing object is not detected, an area where a region of interest is located may be displayed in enlarged form while the vehicle is driving in a dangerous section. In this case, information indicating that no possible accident-causing object is recognized may be displayed as well.

The vehicle may identify whether any possible accident-causing object is recognized by considering gaze information of the user regarding the displayed region of interest (413). As an order whereby the user's gaze stops and a time for which the user's gaze stops can be identified based on a head orientation and an eye orientation of the user by use of a head tracker and an eye tracker, it may be determined as to whether the user recognizes the region of interest. In this case, a predicted drive route for the vehicle to drive may be determined according to whether the user recognizes the region of interest.

Specifically, if the user recognizes an area where the region of interest is located in a slit screen, it corresponds to a case where the user's intervention is allowed in a dangerous situation while driving, and the user may be identified as a user having high concentration. Thus, the user having high concentration is relatively highly likely to evade an accident in response to the dangerous situation. Therefore, the vehicle may guide a predicted drive route including a shortest route and a shortest time even though the predicted drive route includes a dangerous section. For example, if the user recognizes an area where the region of interest is located, the predicted drive route may be determined in consideration of the shortest time or the shortest distance rather than the dangerous section.

Alternatively, if a user does not recognizes an area where a region of interest is located in a split screen, it corresponds to a case where the user's intervention is not allowed in a dangerous situation while driving, and the user may be identified as a user having low concentration. Thus, the user having low concentration may be relatively less likely to evade an accident in response to the dangerous situation. Therefore, the vehicle may guide a predicted drive route such that the predicted drive route includes a less number of dangerous sections than a case where the user recognizes an area where the region of interest is located. For example, a predicted drive route in a case where an area where any region of interest is recognized may include a route having less traffic signals or pedestrians than a predicted drive route in a case where any region of interest is recognized.

Figure 5:
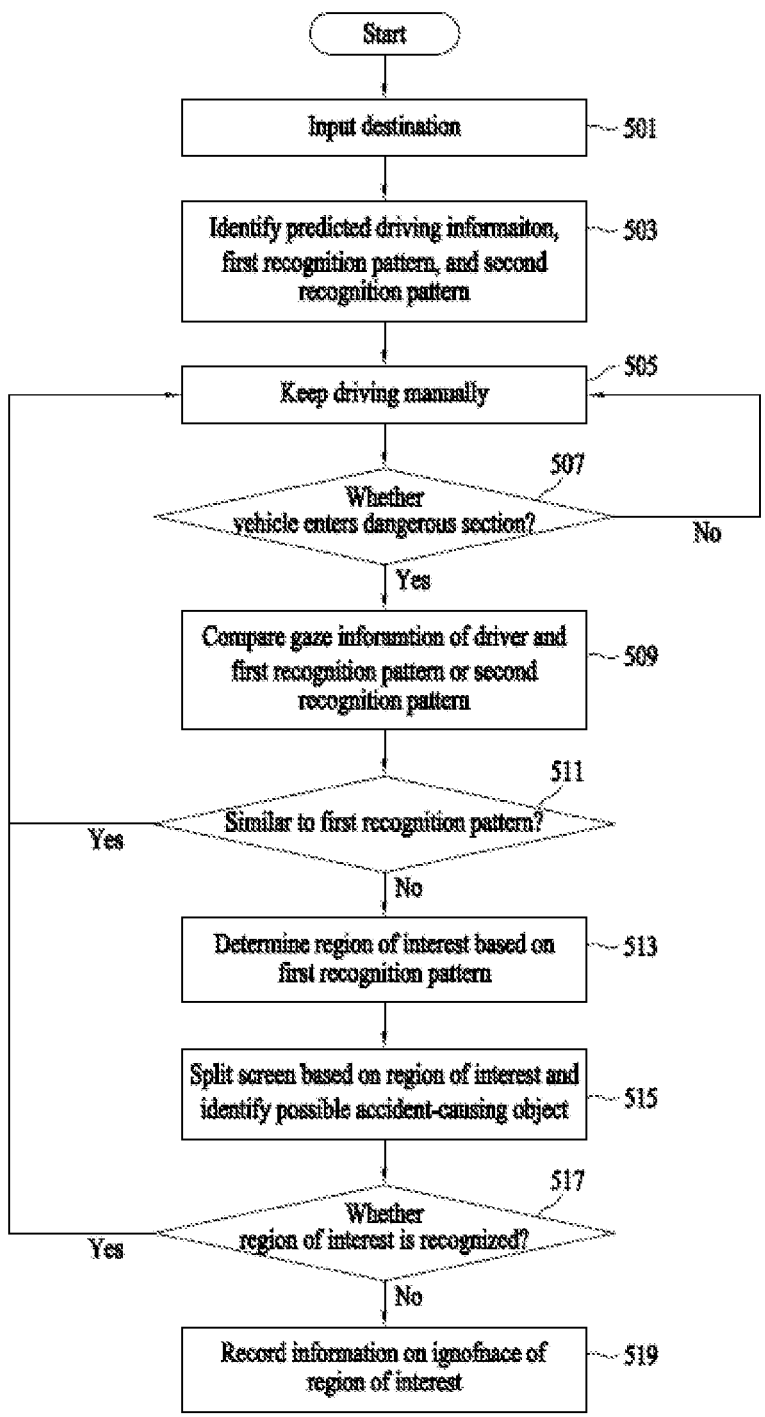
FIG. 5 is a diagram showing a driving guide method of a vehicle which is driving manually according to an embodiment of the present disclosure.

FIG. 5 is a diagram showing a driving guide method of a vehicle which is driving manually according to an embodiment of the present disclosure.

A vehicle may drive manually. A user present in the vehicle may input a destination (501). When the destination is input, the vehicle may acquire a predicted drive route received from a server, and identify at least one recognition pattern information, which is determined based on history information corresponding to predicted driving information, (503). Here, the at least one recognition pattern information may include a first recognition pattern or a second recognition pattern. In addition, gaze information of an occupant in the vehicle may be acquired. Here, the server may be configured as a computation device installed inside or outside the vehicle, and the vehicle may be configured as a computing device as well.

The predicted driving information may include at least one predicted drive route from the current location of the vehicle to the destination, and at least one dangerous section included in the predicted drive route. Here, the predicted drive route may be a route suitable for a preset standard among routes from the current location to the destination. For example, when the user sets the standard in terms of a shortest distance or a shortest time, the predicted drive route may be a shortest distance or a shortest time from the current location to the destination, and, when the user sets the standard in terms of a safe section, the predicted drive route may be a route having a less number of dangerous sections from the current location to the destination. In addition, the dangerous section may be a section where an accident has occurred to an extent beyond a preset standard among at least one section included in the predicted drive route. For example, when a fatal accident has occurred in Section 2 among Section 1, Section 2, and Section 3 included in a predicted drive route, Section 2 may be set as a dangerous section, and, when accident has occurred in Section 3 once or more a day, Section 3 may be set as a dangerous section.

Specifically, the vehicle may receive a first predicted drive route 1, a second predicted drive route, and a third predicted drive route from the current location to the destination from the server, and receive a dangerous section included in each of the predicted drive routes. For example, the vehicle may receive at least one dangerous section included in the first predicted drive route, and at least one dangerous section included in the second predicted drive route.

The vehicle may identify a first recognition pattern and a second recognition pattern corresponding to a dangerous section and received from the server. The first recognition pattern used in the present specification may be determined based on gaze information of a user which has evaded a possible accident in the dangerous section, and the second recognition pattern may be determined based on gaze information of a user who has failed to evade a possible accident in the dangerous section. Gaze information of user indicates an recognition pattern through the user's gaze, and may be determined by taking into consideration an order whereby the user's gaze stops during driving in the dangerous section and a time for which the user's gaze stops. Specifically, the order whereby the user recognizes an object may be identified by the order whereby the user's gaze stops, and the user's concentration on the object may be identified by the time for which the user's gaze stops. In this case, the gaze information of the user may be determined in consideration of the user's gaze on a vehicle ahead, or in consideration of the user's gaze not just on a region forward of the vehicle but also other region (e.g., a front passenger seat, a side mirror, etc.). The user's gaze may be determined based on a head tracker for tracking a head orientation of the user and an eye tracker for tracking an eye orientation of the user.

A type of a possible accident in a dangerous section may be determined by a reason by which the dangerous section is determined. Specifically, a first accident type may correspond to a case where an accident occurs in the dangerous section due to a specific object, a second accident type may correspond to a case where an accident occurs in the dangerous section due to another vehicle, and a third accident type may correspond to a case where an accident occurs in the dangerous section due to a driving state of the vehicle. An accident type is not limited thereto and may be determined by a cause by which the dangerous section is determined.

Having identified the predicted driving information, the first recognition pattern, and the second recognition pattern, the vehicle may keep driving manually along the determined predicted drive route (505). While driving manually, the vehicle may identify whether the vehicle has entered a dangerous section based on a GPS (507).

When entered a dangerous section, recognition pattern information corresponding to gaze information of a user from among at least one recognition pattern information in the corresponding section may be identified. That is, recognition pattern information corresponding to gaze information of the user from among the first recognition pattern and the second recognition pattern may be identified. More specifically, a similarity between the gaze information of the user in the corresponding section and the first recognition pattern or the second recognition pattern may be compared (509). When a similarity between the gaze information of the user and the first recognition pattern is equal to or greater than a preset standard, the gaze information of the user may be determined to be more similar to the first recognition pattern than the second recognition pattern, or, when a similarity between the gaze information of the user and the second recognition pattern is equal to or greater than the preset standard, the gaze information of the user may be determined to be more similar to the second recognition pattern than the first recognition pattern. A standard for determining a similarity may be determined based on a statistical record.

When gaze information of user and the first recognition pattern is identified as being corresponding to each other, that is, when the gaze information of the user is identified as being more similar to the first recognition pattern than the second recognition pattern (511), a recognition state of the user who is driving the vehicle manually may be determined to be a safe state. Alternatively, when the gaze information of the user and the first recognition pattern is identified as not being corresponding to each other (that is, when the gaze information of the user is identified as being more similar to the second recognition pattern than the first recognition pattern), a recognition state of the user who is driving the vehicle manually may be determined to be an unstable state.

When the recognition state of the user is determined to be an unstable state, a region of interest in a dangerous section may be determined using the first recognition pattern (513). Here, the region of interest may include a region requiring the user's care and extracted from the first recognition pattern. The vehicle may display an area including the region of interest. For example, the vehicle may guide the region of interest on a screen using augmented reality. In this case, a speech may be guided as well, saying that "This section is a dangerous section. Keep watching the right lane for safe driving."

The vehicle may split the screen based on the number of regions of interest, and identify a possible accident-causing object where a region of interest is located on the split screen (515). The screen may be spitted according to the number of regions of interest and an area where each region of interest is located. The screen may include a front display (e.g., a front glass) viewed to a user present in the vehicle. For example, if three regions of interest are extracted, the screen may be split into four parts, and the regions of interest may be located in the first quadrant, the third quadrant, and the fourth quadrant in the four-split screen. In this case, for enhancement of computation, the screen may be split by even numbers. For example, if there are five regions of interest, the screen may be split into six parts rather than five parts.

Here, splitting a screen may be determined in consideration of a previous driving record of the user. An example of the previous driving record may include sudden braking, sudden starting, sudden lane change, a reaction speed in response to appearance of an object, and over-speed driving. For example, if the user drives over a speed limit, a numeric value according to the over-speed-limit driving may be included in the previous driving record, and the numeric value may be higher if the level of over-speed-limit driving may increase is higher. In addition, the number of time of the sudden braking and the number of times of the sudden starting may be included in the previous driving record as numeric values, and a corresponding numeric value may be higher if the sudden braking is performed more. By comparing the previous driving record and a preset standard, how the user is skillful at driving may be determined. If the previous driving record is lower than the preset standard, the user may be determined as a highly skillful user performing safe driving. If the previous driving record is higher than the preset standard, the user may be determined as a less skillful user performing unstable driving.

If the previous driving record is higher than the preset standard, the screen may be split by combining regions of interest. For example, in a case where the previous driving record is higher than the preset standard, if regions of interest are located in a first quadrant, a second quadrant, and a sixth quadrant, the screen may be split by combining the first quadrant and the second quadrant. If the previous driving record is lower than the preset standard, the screen may be split by discriminating areas where the respective regions of interest are located. For example, in a case where the previous driving record is lower than the preset standard, if regions of interest are located in the first quadrant, the second quadrant, and the sixth quadrant, the screen may be split so that the first quadrant, the second quadrant, and the sixth quadrant are discriminated. Splitting a screen according to a previous driving record will be described later on with reference to FIGS. 7, 8, and 9.

In an area where a region of interest is located in a split screen, object recognition may be performed in regard with a possible accident-causing object. A recognized possible accident-causing object may be an object corresponding to a region for which a dangerous section is determined. Specifically, if an accident occurs due to a specific object, the possible accident-causing object may be the specific object; if an accident occurs with another vehicle, the possible accident-causing object may be another vehicle or bicycle; and, if an accident occurs due to anxious driving caused by a road surface state, the possible accident-causing object may be the road surface state. For example, if an accident occurs due to another vehicle driving on the right lane joining at a junction, a region of interest may be every other vehicle driving on the right lane and a possible accident causing object may be any other vehicle within a predetermined distance from the manually driving vehicle among the vehicles driving on the right lane.

If any possible accident-causing object is not identified, an area where a region of interest may be displayed in an enlarged form while the vehicle is driving in the dangerous section. In this case, information indicating that no possible accident-causing object is recognized may be displayed as well.

The vehicle may identify whether a region of interest is identified based on gaze information of the user on the region of interest (517). As an order whereby the user's gaze stops and a time for which the user's gaze stops can be identified based on a head orientation and an eye orientation of the user by use of a head tracker and an eye tracker, it may be determined as to whether the user recognizes the region of interest.

Specifically, if the user recognizes an area where the region of interest is located in a slit screen, the user's ignorance of the region of interest may be recorded (519), and the server may receive region-of-interest ignorance information from the vehicle and manage the received region-of-interest ignorance information. If the user ignores the region of interest a predetermined number of times or more, a predicted drive route including a less number of dangerous sections may be generated, compared to a case where the user recognizes the region of interest. For example, if the user ignores a region of interest three times or more, a predicted drive route including a less number of dangerous sections may be generated irrespective of a shortest time or a shortest distance, compared to a case where the user recognizes a region of interest.

If an accident occurs in a corresponding dangerous section due to ignorance of a region of interest, the user's manual driving of the vehicle may be restricted. Thus, the vehicle may drive autonomously rather than manually. In this case, if the user wishes to switch to a manual driving operation, the user needs to virtually learn driving for a predetermined period of time. Specifically, virtual information may be displayed on a screen of the vehicle, and the user may learn recognition on a region of interest based on the virtual information. When the user having done virtual learning, the vehicle may re-switch to the manual driving operation.

Figure 6:
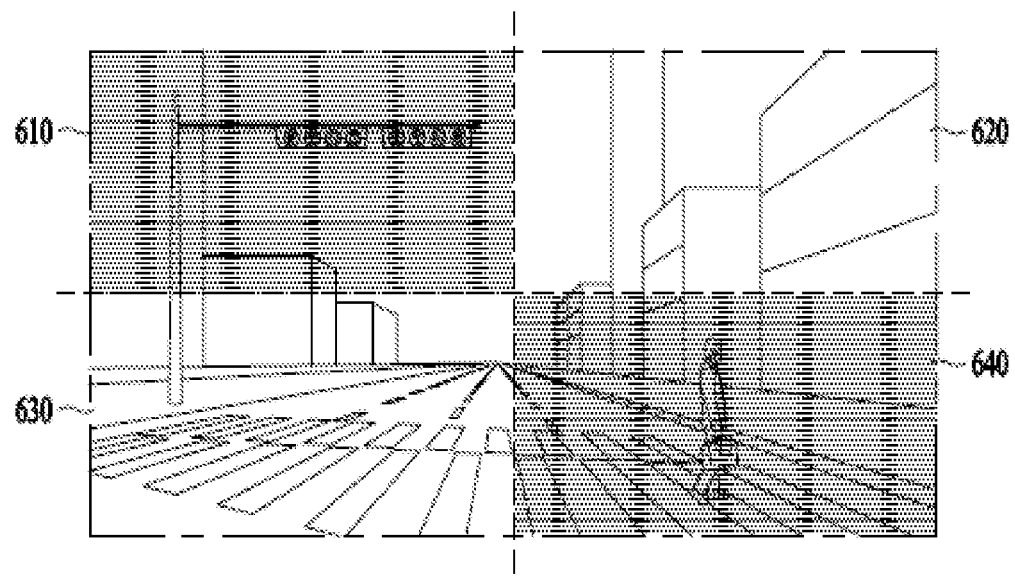
FIG. 6 is a diagram showing a screen split in consideration of a region of interest according to an embodiment of the present disclosure.

FIG. 6 is a diagram showing a screen split in consideration of a region of interest according to an embodiment of the present disclosure.

When a vehicle enters a dangerous section, a first recognition pattern corresponding to a possible accident in the dangerous section may be identified. The first recognition pattern may be determined based on gaze information of a user who has evaded a possible accident type in the dangerous section, and the gaze information may include at least one of an order whereby the user's gaze stops or a time for which the user's gaze stops. A region of interest may include a region required to be recognized by the user and extracted from the first recognition pattern.

Specifically, if the vehicle stops in front of a crosswalk, as shown in FIG. 6, a corresponding section may be a dangerous section. A possible accident type in the dangerous section may be identified based on a previous accident record. For example, if an accident between a person and a vehicle occurred in the corresponding section, regions of interest may be regions where a person and a traffic light are located on the crosswalk. The regions of interest may be a first quadrant 610 where the traffic light is located, and a fourth quadrant 640 where the person is located, and the screen may be split into four parts by taking into consideration of the number of regions of interest and locations of the regions of interest. The vehicle may recognize objects with respect to the first quadrant 610 and the fourth quadrant 640 where the regions of interest are located. For example, the vehicle may acquire and display information related to the traffic light located in the first quadrant 610, where the region of interest is located, and may display, in an enlarged form, the person located in the fourth quadrant 640 where the region of interest is located.

Figure 7:
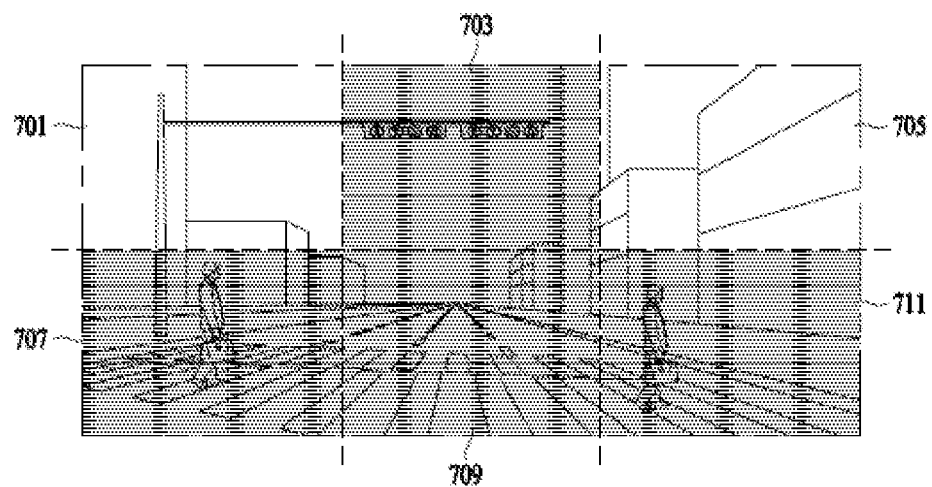
FIG. 7 is a diagram showing a screen split in consideration of a previous driving record according to an embodiment of the present disclosure.
Figure 8:
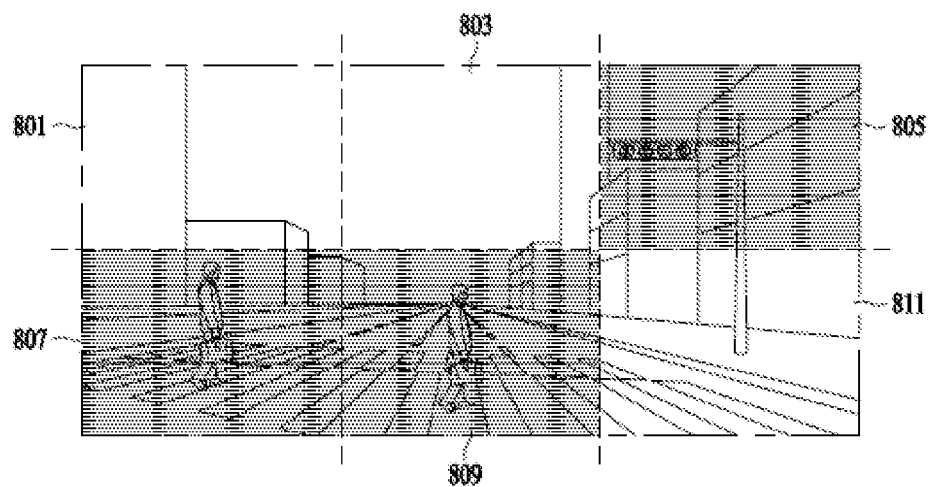
FIG. 8 is a diagram showing a screen split in consideration of a previous driving record according to another embodiment of the present disclosure.
Figure 9:
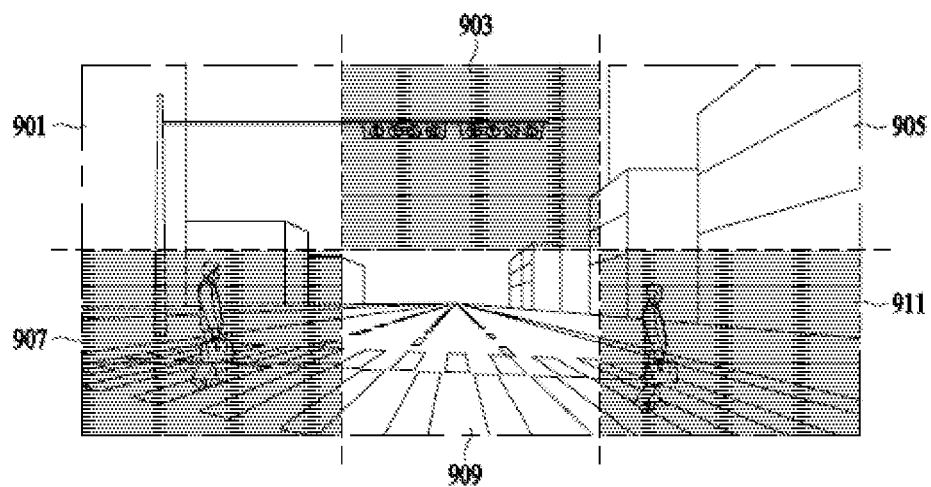
FIG. 9 is a diagram showing a screen split in consideration of a previous driving record according to another embodiment of the present disclosure.

FIG. 7 is a diagram showing a screen split in consideration of a previous driving record according to an embodiment of the present disclosure. FIG. 8 is a diagram showing a screen split in consideration of a previous driving record according to another embodiment of the present disclosure. FIG. 9 is a diagram showing a screen split in consideration of a previous driving record according to another embodiment of the present disclosure.

A screen may be split in a different manner based on a previous driving record of a user. For example, if the user drove over a speed limit in the past, a level of the over-speed-limit driving and the number of times of over-speed-limit driving may be included in the previous driving record. The higher the level of over-speed-limit driving is or the more the over-speed-limit driving is performed, the greater the numeric value may be achieved. By comparing a numeric value included in the previous driving record and a preset standard, how the user is skillful at driving may be determined. If the previous driving record is lower than the preset standard, the user may be determined as a highly skillful user performing a safe driving, and, if the previous record is higher than the preset standard, the user may be determined as a less skillful user performing an unstable driving.

According to an embodiment, if the previous driving record is higher than the preset standard, the screen may be split by combining adjacent areas where regions of interest are located. For example, the screen of the vehicle may be split into six parts, as shown in FIGS. 7, 8, and 9, in consideration of the number of the regions of interest and the locations of the regions of interest. In this case, an area where a region of interest is located in a corresponding dangerous section in FIG. 7 may be a second quadrant 703, a fourth quadrant 705, and a sixth quadrant 711. In addition, an area where a region of interest is located in a corresponding dangerous section in FIG. 8 may be a third quadrant 805, a fourth quadrant 807, and a fifth quadrant 809. If a previous driving record of a user driving the vehicle is identified as being higher than the preset standard, the vehicle may split the screen by combining areas where the regions of interest are located.

Specifically, as shown in FIG. 7, when areas where a fourth quadrant 707 and the sixth quadrant 711 are located are combined, the fifth quadrant 709 may be combined as well in order to increase computational processing speed and thereby the screen may be split by even numbers. The fourth quadrant 707, the fifth quadrant 709, and the sixth quadrant 711 may be combined while a first quadrant 701, the second quadrant 703, and the third quadrant 705 may be not combined but split.

In addition, as shown in FIG. 8, areas where the fourth quadrant 807 and the fifth quadrant 809 are located may be combined. In this case, when the screen is split in order to increase computational processing speed, a first quadrant 801 and a second quadrant 803 may be combined due to the combination of the fourth quadrant 807 and the fifth quadrant 809 and thereby the screen may be split into four parts. The first quadrant 801 and the second quadrant 803 may be combined, the fourth quadrant 807 and the fifth quadrant 809 may be combined, and the third quadrant 805 and the sixth quadrant 811 may be not combined but remain split. That is, the screen may be split into (the first quadrant, the second quadrant), (the third quadrant), (the fourth quadrant, the fifth quadrant), and (the sixth quadrant).

According to another embodiment, when the previous driving record is lower than the preset standard, the screen may be split by discriminating areas where the regions of interest are located. For example, as shown in FIG. 9, the screen of the vehicle may be split into six parts in consideration of the number of regions of interest and the locations of the regions of interest. In this case, areas where the regions of interest are located in a corresponding dangerous section may be a second quadrant 903, a fourth quadrant 905, and a sixth quadrant 911 in FIG. 9. When a previous driving record of a user driving the vehicle is identified as being lower than the preset standard, the vehicle may split the screen by discriminating the areas where the regions of interest are located. Specifically, as shown in FIG. 9, the areas where the second quadrant 903, the fourth quadrant 905, and the sixth quadrant 911 are located may be not combined, unlike the examples of FIGS. 7 and 8, but may be discriminated and displayed on the screen.

Figure 10:
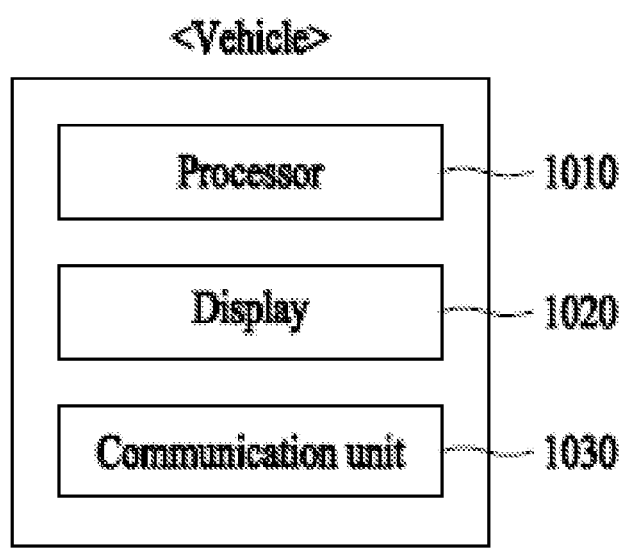
FIG. 10 is a diagram showing a block diagram of a vehicle according to an embodiment of the present disclosure.

FIG. 10 is a diagram showing a block diagram of a vehicle according to an embodiment of the present disclosure.

A vehicle including a computation device according to an embodiment of the present disclosure may include a processor 1010, a display 1020, and a communication unit 1030. The vehicle may further include a memory (not shown) that stores data. It is apparent for those skilled in the art that features and functions of the processor 1010, the memory (not shown), and the communication unit 1030) may correspond to the processor 180, the memory 170, and the communication unit 110 shown in FIG. 1. In addition, the memory may be embedded in the vehicle or installed in the outside, and, when the memory is installed in the outside, the vehicle may receive information stored in the memory. The display 1020 may include a front screen, a side screen, and a rear screen in the vehicle. The processor may generally control overall operations of the vehicle. For example, the processor 1010 may generally control the communication unit, a sensor, etc. by executing programs stored in the memory.

In addition, the processor 1010 may identify predicted driving information, a first recognition pattern, and a second recognition pattern of the vehicle driving manually, and may identify a similarity between gaze information of the user and the first recognition pattern or the second recognition pattern. According to the identified similarity, a region of interest may be determined using the first recognition pattern corresponding to a dangerous section. Alternatively, the processor 1010 may identify predicted driving information and a first recognition pattern of a vehicle driving autonomously. A region of interest may be determined using the first recognition pattern corresponding to a dangerous section included in the predicted driving information. In this case, the region of interest may be displayed on the screen, and whether the user recognizes the region of interest may be identified. In this case, the region of interest may include a part extracted from the first recognition pattern and required to be recognized by the user, the first recognition pattern may include gaze information of the user to prevent a possible accident type in the dangerous section, and the second recognition pattern may include gaze information of the user corresponding to the possible accident type in the dangerous section.

Figure 11:
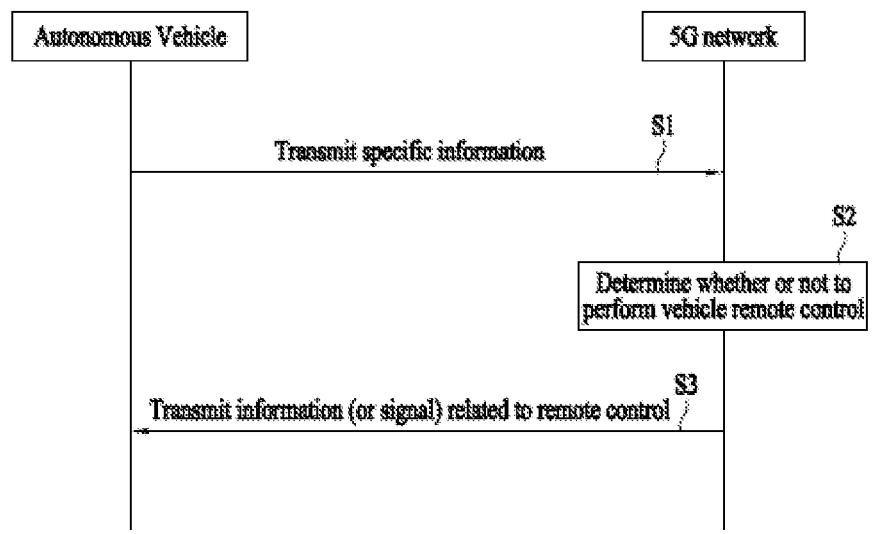
FIG. 11 is a diagram showing an operation between a vehicle and a network according to an embodiment of the present disclosure.

FIG. 11 is a diagram showing an operation between a vehicle and a network according to an embodiment of the present disclosure. Specifically, FIG. 11 shows operations between an autonomous vehicle and a network using wireless communications. In this case, examples of the wireless communications include, for example, 5G communications, and examples of the network may include a 5G network. Here, the network may correspond to a server.

The autonomous vehicle transmits specific information to the 5G network (S1). The specific information may include autonomous driving-related information. In addition, the 5G network may determine whether to control the vehicle remotely (S2). Here, the 5G network may include a server or module that performs remote control regarding an autonomous driving operation. In addition, the 5G network may transmit information (or a signal) related to a remote control to the autonomous vehicle (S3).

In order for the autonomous vehicle to transmit and receive signals and information with the 5G network as in steps S1 and S3 of FIG. 11, the autonomous vehicle performs an initial access procedure and a random access procedure with the 5G network prior to the step S1 of FIG. 11.

More specifically, the autonomous vehicle performs the initial access procedure with the 5G network based on SSB in order to acquire DL synchronization and system information. A beam management (BM) process and a beam failure recover process may be added in the initial access procedure, and a quasi-co location (QCL) relation may be added in a process whereby the autonomous vehicle receives a signal from the 5G network.

In addition, the autonomous vehicle performs the random access procedure with the 5G network in order to acquire UL synchronization and/or transmit UL. In addition, the 5G network may transmit a UL grant for scheduling transmission of specific information to the autonomous vehicle. Accordingly, the autonomous vehicle transmits the specific information to the 5G network based on the UL grant. In addition, the 5G network transmits a DL grant for scheduling transmission of a 5G processing result on the specific information to the autonomous vehicle. Accordingly, the 5G network may transmit information (or a signal) related to a remote control to the autonomous vehicle based on the DL grant.

Next, a basic procedure between a method proposed hereinafter in the present disclosure and an application operations to be applied to URLLC of 5G communications will be described.

As described above, after performing the initial access procedure and/or the random access procedure with the 5G network, the autonomous vehicle may receive DownlinkPreemption IE from the 5G network. The autonomous vehicle may receive DCI format 2_1 including a pre-emption indication from the 5G network based on the DownlinkPreemption IE. The autonomous vehicle does not perform (or expect/assume) reception of eMBB data in a resource (a PRB and/or OFDM symbol) indicated by a preamble indication (pre-emption indication). When it is necessary to transmit specific information, the autonomous vehicle may receive a UL grant from the 5G network.

Next, a basic procedure between a method proposed hereinafter in the present disclosure and an application operations to be applied to mMTC of 5G communications will be described.

What is changed after application of mMTC in the steps of FIG. 11 will be mainly described.

In the step S1 of FIG. 1, the autonomous vehicle receives a UL grant from the 5G network to transmit specific information to the 5G network. Here, the UL grant may include information on a repetition number regarding transmission of the specific information, and the specific information may be transmitted repeatedly based on the information on the repetition number. That is, the autonomous vehicle may transmit the specific information to the 5G network based on the UL grant. In addition, repetitive transmission of the specific information is performed in a frequency hopping manner, first transmission of the specific information may be performed in a first frequency resource, and second transmission of the specific information may be performed in a second frequency resource. The specific information may be transmitted through a narrowband of 6 Resource Block (RB) or 1 Resource Block (RB).

Figure 12:
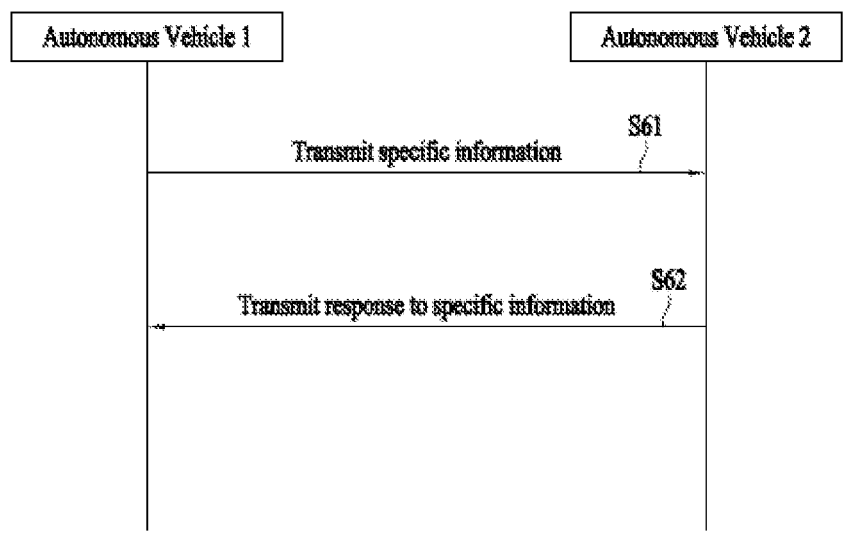
FIG. 12 illustrates an example of an operation between vehicles using wireless communications according to an embodiment of the present disclosure.

FIG. 12 illustrates an example of an operation between vehicles using wireless communications according to an embodiment of the present disclosure. In this case, examples of the wireless communications may include 5G communications. A first vehicle transmits specific information to a second vehicle (S61). The second vehicle transmits a response to the specific information to the first vehicle (S62).

Meanwhile, an application operation between vehicles may be configured differently according to whether the 5G network is involved in resource allocation regarding the specific information and a response to the specific information directly Sidelink Communication Transmission Mode 3) or indirectly (Sidelink Communication Transmission Mode 4).

Next, an application operation between vehicles using 5G communications will be described.

First, a method whereby the 5G network is involved directly in resource allocation for signal transmission/reception between vehicles will be described.

The 5G network may transmit DCI format 5A to the first vehicle for Mode 3 transmission (transmission of a physical sidelink control channel (PSCCH) and/or physical sidelink shared channel (PSSCH)). Here, the PSCCH is a 5G physical channel for scheduling of transmission of specific information, and the PSSCH is a 5G physical channel for transmitting the specific information. The first vehicle transmits, on the PSCCH, a SCI format for scheduling of transmission of the specific information to the second vehicle. The first vehicle transmits, on the PSSCH, the specific information to the second vehicle. Then, the first vehicle transmits, on the PSCCH, an SCI format for scheduling transmission of the specific information to the second vehicle. The first vehicle transmits, on the PSSCH, the specific information to the second vehicle.

Then, a method whereby the 5G network is indirectly involved in resource allocation for signal transmission/reception will be described.

The first vehicle senses a resource for Mode 4 transmission on a first window. Based on a result of the sensing, the first vehicle selects a resource for Mode 4 transmission on a second window. Here, the first window refers to a sensing window, and the second window refers to a selection window. The first vehicle transmits, on the PSCCH, SCI format 1 for scheduling transmission of the specific information to the second vehicle based on the selected resource. The first vehicle transmits, on the PSSCH, the specific information to the second vehicle.

In addition, in one embodiment, the autonomous vehicle performing at least one vehicle-to-vehicle (V2V) communication or vehicle-to-everything (V2X) communication may transmit and receive information on a channel corresponding to corresponding communication. For example, for the V2V communication and the V2X communication, a channel for a sidelink corresponding to the corresponding communication method may be allocated and the autonomous vehicle may transmit and receive information on a corresponding channel with a server or with another vehicle. For example, a shared channel for sidelink may be allocated, and a signal for at least one of the V2V communication or the V2X communication may be transmitted and received on the corresponding channel. In order to perform at least one of the V2V communication or the V2X communication, the autonomous vehicle may acquire an additional identifier corresponding to corresponding communication from at least one a base station, a network, or another vehicle. Based on information on the acquired additional identifier, the autonomous vehicle may perform the V2V communication and the V2X communication.

In addition, in one embodiment, information to be transmitted in a broadcast manner may be transmitted on an additional channel for broadcasting, and communication between nodes may be performed on a channel different from the channel for broadcasting. In addition, information for controlling the autonomous vehicle may be transmitted on a channel for URLLC.

Although preferred embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

What is claimed is:

1. A driving guide method in a computation device, the method comprising:
   acquiring predicted driving information of a vehicle that is driving manually;
   acquiring gaze information of a user of the vehicle;
   identifying at least one recognition pattern information that is acquired based on history information corresponding to the predicted driving information;
   identifying recognition pattern information corresponding to the gaze information from among the at least one recognition pattern information; and
   displaying information on a region of interest that is determined based on the recognition pattern information.

2. The driving guide method of claim 1, further comprising, based on the region of interest and the gaze information of the user, identifying whether the user recognizes the region of interest,
   wherein the at least one recognition pattern information comprises a first recognition pattern based on a gaze of a user who has evaded a possible accident in a dangerous section included in the predicted driving information, and a second recognition pattern based on a gaze of a user who has failed to evade the possible accident in the dangerous section.

3. The driving guide method of claim 2,
   wherein the displaying of the information on the region of interest comprises identifying a possible accident-causing object included in the displayed region of interest, and
   wherein the region of interest comprises a region extracted from the first recognition pattern and required to be recognized by the user, and the possible accident-causing object comprises an object corresponding to a cause by which the dangerous section is determined.

4. The driving guide method of claim 2, wherein the displaying of the information on the region of interest comprises:
   when a previous driving record of the user satisfies a preset standard, splitting a screen by combining the region of interest; or
   when the previous driving record fails to satisfy the preset standard, splitting the screen by discriminating the region of interest.

5. The driving guide method of claim 2,
   wherein the identifying of whether the region of interest is recognized comprises, when the user does not recognizes the displayed region of interest, guiding a predicted drive route such that the predicted driving route includes a less number of dangerous sections compared to a case where the user recognizes the region of interest, and
   wherein when an accident occurs because the region of interest is not recognized, the manual driving of the vehicle by the user is controlled.

6. A driving guide method in a computation device, the method comprising:
   acquiring predicted driving information of a vehicle that is driving autonomously;
   acquiring gaze information of a user of the vehicle;
   identifying a first recognition pattern that is acquired based on history information corresponding to the predicted driving information; and
   displaying information on a region of interest that is determined based on the first recognition pattern corresponding to at least one dangerous section included in the predicted driving information.

7. The driving guide method of claim 6, further comprising, based on the region of interest and the gaze information of the user, identifying whether the user recognizes the region of interest,
   wherein the region of interest comprises a region extracted from the first recognition pattern and required to be recognized by the user, the possible accident-causing object comprises an object corresponding to a reason for the at least one dangerous section is determined, and the first recognition pattern is determined based on gaze information of a user who has evaded a possible accident in the at least one dangerous section.

8. The driving guide method of claim 7,
   wherein the displaying of the information on the region of interest comprises:
   when the possible accident-causing object is located in the region of interest, performing object recognition is performed with respect to the possible accident-causing object and thereby displaying the recognized possible accident-causing object; or
   when the possible accident-causing object does not exist, displaying an area where the region of interest is located in an enlarged form.

9. The driving guide method of claim 6,
   wherein the predicted driving information comprises a predicted drive route of the vehicle and information on a dangerous section included in the predicted drive route,
   wherein the first recognition pattern is determined based on a gaze of a user who has evaded a possible accident in the dangerous section, and
   wherein gaze information of the user comprises an order whereby the user's gaze stops and a time for which the user's gaze stop.

10. The driving guide method of claim 7, wherein the identifying of whether the region of interest is recognized comprises:

when the region of interest is recognized by the user in consideration of the gaze information of the user, guiding a predicted drive route such that the predicted drive route comprises a shortest route to a destination of the vehicle; or when the region of interest is not recognized by the user, guiding the predicted drive route such that the predicted drive route comprises a less number of dangerous sections compared to a case when the region of interest is recognized by the user.

11. A vehicle comprising:

a processor configured to acquire predicted driving information of the vehicle driving manually, acquire gaze information of a user of the vehicle, identify at least one pattern information acquired based on history information corresponding to the predicted driving information, identify recognition pattern information corresponding to the gaze information among the at least one recognition pattern information; and a display configured to display information on a region of interest that is determined based on the recognition pattern information.

12. The vehicle of claim 11, wherein the processor is configured to identify whether the region of interest is recognized by the user based on the region of interest and the gaze information of the user, and wherein the at least one recognition pattern information comprises a first recognition pattern based on a gaze of a user who has evaded a possible accident in a dangerous section included in the predicted driving information, and a second recognition pattern based on a gaze of a user who has failed to evade the possible accident in the dangerous section.

13. The vehicle of claim 12, wherein the processor is configured to identify a possible accident-causing object included in the displayed region of interest; and wherein the region of interest comprises a region extracted from the first recognition pattern and required to be recognized by the user, and the possible accident-causing object comprises an object corresponding to a cause by which the dangerous section is determined.

14. The vehicle of claim 12, wherein the processor is configured to:

when a previous driving record of the user satisfies a preset standard, splitting a screen by combining the region of interest; or when the previous driving record fails to satisfy the preset standard, splitting the screen by discriminating the region of interest.

15. The vehicle of claim 12, wherein the processor is configured to:

when the user does not recognizes the displayed region of interest, guide a predicted drive route such that the predicted driving route includes a less number of dangerous sections compared to a case where the user recognizes the region of interest; and when an accident occurs because the region of interest is not recognized, control the manual driving of the vehicle by the user.

* * * * *